United States Patent Office 2,927,918
Patented Mar. 8, 1960

2,927,918

HYDROXYPROPYLATION OF HYDROXY COMPOUNDS

Arthur W. Anderson, Midland, Mich., assignor to The Dow Chemical Company, Midland, Mich., a corporation of Delaware No Drawing. Application December 24, 1956
Serial No. 630,067

12 Claims. (Cl. 260—209)

This invention relates to processes for the hydroxypropylation of polyols and to the products thus formed.

It is well known to react alkylene oxides with hydroxy compounds and thus form polyoxyalkylene derivatives of the hydroxy compound. Since the reaction of a molecule of alkylene oxide with a hydroxy group generates a new hydroxy group which is itself reactive toward the alkylene oxide, there is a great tendency toward the formation of chains of oxyalkylene groups:

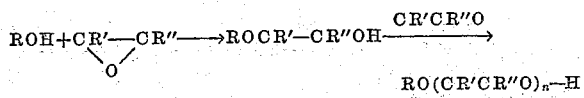

$$RO(CR'CR''O)_n-H$$

Heretofore, no method has been available for avoiding the formation of polyoxyalkylene chains in the reaction of an alkylene oxide with a hydroxy compound. If the amount of alkylene oxide used in previously known processes is limited to one mole for each hydroxyl group in the hydroxy reagent, it is found that the product obtained is not a pure mono-oxyalkylated derivative of the hydroxy reagent but rather is a gross mixture containing not only the desired mono-oxyalkylated derivative but also polyoxyalkylated derivatives wherein the polyoxyalkylene chains are of varying length, together with large amounts of hydroxy reagent that has not been oxyalkylated at all. The isolation of the desired product from such a mixture is fairly easy when the products are derived from mono- or di-hydroxy reagents of low molecular weight, since the products are then usually distillable. However, when the hydroxy reagent contains three or more hydroxyl groups, the products can be distilled only with great difficulty, if at all, and separation and purification of the mono-oxy alkylation product becomes impractical if not impossible.

It is an object of this invention to provide processes whereby polyols containing three or more alcoholic hydroxyl groups can be caused to react with an alkylene oxide so that each reacting hydroxyl group of the polyol reacts with one, and only one, mole of the alkylene oxide. Another object is to provide oxyalkylene derivatives of polyols wherein the hydrogen atom of each reactive alcoholic OH group has been replaced with a hydroxyalkyl group. Other objects will appear hereinafter.

According to the invention, certain polyols, namely those containing 3 to 8 alcoholic hydroxyl groups, react with propylene oxide in the presence of a catalytic amount of triethyl- or tripropylamine to form the 2-hydroxy-propyl ethers without the formation of any significant amount of polyoxypropylene ethers. In other words, after one mole of propylene oxide has reacted with a hydroxyl group of the polyol, the hydroxyl group of the thus formed 2-hydroxypropyl group is inert toward propylene oxide, even though an excess of the latter may be present.

In general, primary hydroxyl groups are most reactive toward propylene oxide. Hence, when the amount of the latter used is insufficient to react with all reactive hydroxyl groups in the polyol, the primary hydroxyls usually react preferentially. Thus, glycerol, for example, may be treated with one mole of propylene oxide to produce the alpha ether; with two moles to produce the alpha, gamma-diether; or with three or more moles to produce the triether. In each case, the 2-hydroxypropyl ether is formed exclusively, there being formed no polyoxypropylene ethers.

The specificity of the reaction of the invention, whereby only one mole of alkylene oxide per reactive hydroxyl group will react, depends on three critical limitations:

(1) The alkylene oxide. Only propylene oxide is operative.
(2) The catalyst. Only triethyl- and tripropylamine are operative.
(3) The polyol. Only those polyols containing 3 to 8 alcoholic hydroxyl groups are operative.

Any attempt to operate outside the above limitations results either in no reaction or in the ordinary random-type reaction wherein polyoxyalkylene chains are formed.

The amount of catalyst used is not critical. Less than about 0.1 percent by weight, based on total reactants, produces only a very slow reaction while amounts above about 1 percent produce little added effect. As a matter of convenience and economy, the preferred concentration is about 0.2 to .5 percent.

Likewise, the temperature at which the process is carried out is not critical. At temperatures below about 80 degrees C. the rate of reaction is inconveniently low while at temperatures above about 160 degrees to 200 degrees C. the reaction may be undesirably vigorous. Moreover, when heat-sensitive reagents such as the sugars, are used, they may be damaged or the product may be darkened by high temperatures. The preferred temperature will depend somewhat on the reactivity and stability of the polyol as well as on the catalyst being used. It has been observed that tripropylamine is a less active catalyst than triethylamine and requires somewhat higher temperatures to achieve equal reaction rate. In general, the preferred temperature range is about 100–160 degrees C.

The operating pressure should be at least equal to the autogenous pressure in order that the reagents may be kept in the liquid state. Beyond this, pressure is of no significance.

If desired, an inert solvent may be used to dissolve the polyol used in the process of the invention, though this is not necessary and it is generally preferable to avoid the use of a solvent. While many polyols, particularly the polymethylol compounds, such as pentaerythritol, and the sugars are insoluble in propylene oxide, it is not generally necessary or desirable to dissolve them in an inert solvent. It has been found that most, if not all such polyols, even in the solid form, react slowly with propylene oxide in the process of the invention and that, once the reaction is started, the intermediate products are much more soluble; hence, the reactants soon dissolve in the propylene oxide and further reaction proceeds in a homogeneous solution at a normal rate.

The following is a suitable general procedure for carrying out the process of the invention:

The polyol, the catalyst and at least a portion of the propylene oxide to be used are put into a suitable pressure reactor provided with heating, cooling and stirring means. The reactor is sealed, the stirrer is activated and the charge is heated to a temperature at which a satisfactory rate of reaction is obtained, usually in the range of 100-160 degrees C. The temperature is then maintained at the desired point by heating or cooling the charge as necessary. Additional propylene oxide as desired is pumped into the reactor as the reaction proceeds. In case all reactive hydroxyl groups are to be oxypropylated, an excess of propylene oxide may be used, since any such excess will remain after the reaction ceases and is easily recovered by distilling it from the product. The use of such excess is generally desirable since it accelerates the reaction in its latter stages and assures the complete and uniform reaction of the polyol. In case fewer than all of the reactive hydroxyl groups are to be oxypropylated, only the theoretically required amount of propylene oxide should be put into the reactor. The reaction will then be complete when the reactor pressure drops to zero and becomes constant.

The products thus obtained are usually sirupy liquids and are produced in quantitative yields. Ordinarily, no purification is needed other than to strip off any volatile material. This consists mainly of unreacted propylene oxide and the amine catalyst.

The practice of the invention is further illustrated by the following examples.

*Example 1.—Octakis-(2-hydroxypropyl)-sucrose*

A jacketed autoclave was charged with 3600 g. of propylene oxide, 2400 g. of sucrose and 21 g. of triethylamine. It was then heated, with stirring, at 105-110 degrees C. for 3 hours, at 110-115 degrees for 2 hours and then at 105 degrees for 1 hour. The maximum pressure attained was 107 p.s.i.g. and the final pressure was 30 p.s.i.g.

After the pressure became constant, indicating the reaction was complete, the excess propylene oxide was vented and vacuum was applied for a few minutes to strip out volatile materials. The residue, obtained in quantitative yield, was a sirupy liquid having the properties shown in Table I, below.

When the above experiment was repeated except that trimethylamine was used as the catalyst, all the propylene oxide reacted, the final pressure was zero and the product contained polyoxypropylene chains. This same result was obtained even when the reaction temperature was only 80-90 degrees C.

When the above experiment was repeated except that tri-n-propylamine was used as the catalyst, it was found that the reaction was quite slow until a temperature of 140 degrees C. was reached. Reaction then proceeded normally, the pressure dropped to 30 p.s.i.g. and the product was substantially identical to that obtained with triethylamine as the catalyst.

*Example 2.—Tris-(2-hydroxypropoxy)-propane*

By use of an apparatus and procedure similar to that used in Example 1, glycerol was treated with 3.4 molar equivalents of propylene oxide, triethylamine being the catalyst used. The reaction ceased when 3 equivalents of oxide had reacted and, even though the temperature was raised to 180 degrees C., no further reaction occurred and the pressure remained constant at 70 p.s.i.g.

Just as in the case of sucrose, when trimethylamine was used as the catalyst instead of triethylamine in the above reaction, all the propylene oxide reacted, the pressure dropped to zero and the product contained polyoxypropylene chains.

*Example 3.—Hexakis-(2-hydroxypropoxy)-hexane*

Sorbitol was heated with 7 molar equivalents of propylene oxide and a catalytic amount of triethylamine substantially as described in Example 1. It was found that 1 molar equivalent of oxide had not reacted and that the product consisted of a quantitative yield of the hexakis-(2-hydroxypropyl ether) of sorbitol.

*Example 4.—Tetrakis-(2-hydroxypropoxy-methyl)-methane*

Pentaerythritol was treated with an excess of propylene oxide in the presence of triethylamine as a catalyst, substantially as described in Example 1. The reaction ceased when 4 molar equivalents of oxide had reacted and the product, obtained in quantitative yield was the tetrakis-(2-hydroxypropyl ether) of pentaerythritol.

TABLE I.—PROPERTIES OF POLYOL ETHERS

| Product of Ex. No. | Polyol Used | $n_D^{25}$ | $d_{25}^{25}$ | Viscosity @ 25° C., Cstks. |
|---|---|---|---|---|
| 1 | sucrose | 1.4860 | 1.187 | (1) |
| 2 | glycerol | 1.4580 | 1.073 | 615 |
| 3 | sorbitol | 1.4750 | 1.125 | (1) |
| 4 | pentaerythritol | 1.4673 | 1.094 | (1) |

[1] Too viscous to run at 25° C.

The compounds produced in the above examples in accord with the invention are sirupy, hygroscopic, water-soluble liquids and are useful as humectants; as plasticizers for paper, cellophane, cellulose ethers and the like; and as chemical intermediates in the production of alkyd resins, polyurethane resins and the like. They may be esterified with monocarboxylic acids to produce esters, such as the acetate, propionate, benzoate, and the like, which are not hygroscopic or appreciably water-soluble and which are particularly useful as plasticizers for cellulose resins such as ethyl-cellulose and cellulose acetate. As plasticizers for ethyl-cellulose they are used in amounts of 10 to 50 percent, by weight, of the base resin while for cellulose acetate they are generally used in amounts of 5 to 25 percent, by weight, of the base resin.

The products of Examples 1 and 2 are particularly useful as plasticizers or softeners for paper and cellophane. For such use they are incorporated into the base material in the amount of about 5 to 20 percent by weight, based on the base material. This may be done at a suitable stage in the manufacture of the base material or the plasticizer may be sprayed onto or otherwise applied to the surface of the paper or cellophane to be treated.

I claim:

1. A process comprising reacting propylene oxide with a polyol selected from the group consisting of glycerol, pentaerythritol, sorbitol and sucrose in the presence of a catalytic amount of a trialkylamine wherein the alkyl groups each contain 2 to 3 carbon atoms, whereby each hydroxyl group of the polyol is etherified with a 2-hydroxypropyl group.

2. A process as defined in claim 1 wherein the polyol is glycerol.

3. A process as defined in claim 1 wherein the polyol is pentaerythritol.

4. A process as defined in claim 1 wherein the polyol is sorbitol.

5. A process as defined in claim 1 wherein the polyol is sucrose.

6. A process as defined in claim 1 wherein the trialkylamine is triethylamine.

7. A process as defined in claim 1 wherein the trialkylamine is tripropylamine.

8. A compound selected from the group consisting of octakis-(2-hydroxypropyl)-sucrose, tris-(2-hydroxypropoxy)-propane, hexakis-(2-hydroxypropoxy)-hexane and tetrakis-(2-hydroxypropoxymethyl)-methane substantially free of cogeneric isomers.

9. Octakis-(2-hydroxypropyl)-sucrose substantially free of cogeneric isomers.

10. Tris-(2-hydroxypropoxy)-propane substantially free of cogeneric isomers.

11. Hexakis-(2-hydroxypropoxy)-hexane substantially free of cogeneric isomers.

12. Tetrakis-(2-hydroxypropoxymethyl)-methane substantially free of cogeneric isomers.

References Cited in the file of this patent

UNITED STATES PATENTS

| | | |
|---|---|---|
| 1,863,208 | Schorger | June 14, 1932 |
| 1,959,930 | Schmidt et al. | May 22, 1934 |
| 2,552,528 | De Groote | May 15, 1951 |
| 2,562,884 | Barham | Aug. 7, 1951 |
| 2,733,238 | Kerr et al. | Jan. 31, 1956 |